(12) United States Patent
Koenig

(10) Patent No.: US 10,684,149 B2
(45) Date of Patent: Jun. 16, 2020

(54) SYSTEM AND METHOD OF MEASURING TURBINE VANE COOLING AIR CONSUMPTION DURING ENGINE OPERATION

(71) Applicant: Rolls-Royce Corporation, Indianapolis, IN (US)

(72) Inventor: Eric Koenig, Fishers, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 129 days.

(21) Appl. No.: 15/916,755

(22) Filed: Mar. 9, 2018

(65) Prior Publication Data

US 2019/0277676 A1 Sep. 12, 2019

(51) Int. Cl.
| | |
|---|---|
| G01F 1/44 | (2006.01) |
| F01D 9/02 | (2006.01) |
| F01D 17/02 | (2006.01) |
| F02C 7/18 | (2006.01) |
| F01D 5/18 | (2006.01) |

(52) U.S. Cl.
CPC .............. *G01F 1/44* (2013.01); *F01D 5/187* (2013.01); *F01D 9/023* (2013.01); *F01D 17/02* (2013.01); *F02C 7/18* (2013.01); *F05D 2220/32* (2013.01); *F05D 2240/12* (2013.01); *F05D 2260/20* (2013.01); *F05D 2260/81* (2013.01); *F05D 2270/301* (2013.01); *F05D 2270/303* (2013.01); *F05D 2270/3015* (2013.01); *F05D 2270/3062* (2013.01)

(58) Field of Classification Search
CPC combination set(s) only.
See application file for complete search history.

(56) References Cited

U.S. PATENT DOCUMENTS

| | | | |
|---|---|---|---|
| 4,332,133 A | 6/1982 | Schwarz et al. | |
| 4,807,433 A | 2/1989 | Maclin et al. | |
| 6,382,906 B1 * | 5/2002 | Brassfield | F01D 5/18 |
| | | | 415/115 |
| 6,393,825 B1 | 5/2002 | Leone et al. | |
| 6,427,448 B1 | 8/2002 | Reichert | |
| 6,719,526 B2 | 4/2004 | Sanborn et al. | |
| 2007/0212212 A1 * | 9/2007 | Luttenberg | F01D 5/085 |
| | | | 415/116 |
| 2011/0082662 A1 * | 4/2011 | Nilsson | G01K 17/00 |
| | | | 702/130 |
| 2017/0204736 A1 * | 7/2017 | Varney | F01D 11/24 |

* cited by examiner

Primary Examiner — Dwayne J White
Assistant Examiner — Danielle M. Christensen
(74) Attorney, Agent, or Firm — Barnes & Thornburg LLP

(57) ABSTRACT

Vanes for use in gas turbine engines and methods of measuring cooling air flow through vanes are disclosed herein. Each vane includes an airfoil and an end wall. The airfoil is shaped to interact with hot gasses moving along a primary gas path during operation of the gas turbine engine. The end wall is coupled to the airfoil and shaped to define a boundary of the primary gas path near a radial end of the airfoil. The end wall includes a platform that is exposed to the primary gas path and a projection that extends away from the platform and is located outside the primary gas path.

18 Claims, 5 Drawing Sheets

SYSTEM AND METHOD OF MEASURING TURBINE VANE COOLING AIR CONSUMPTION DURING ENGINE OPERATION

FIELD OF THE DISCLOSURE

The present disclosure relates generally to vanes used in gas turbine engines, and more specifically to end walls of vanes used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that may require the airfoils to be actively cooled by supplying relatively cool air to the vanes and blades. Relatively cool air may sometimes be passed through the airfoils of the vanes and blades to allow those components to withstand the high temperatures of the combustion products. Cooling airfoils of the vanes and blades to withstand those temperatures remains an area of interest.

SUMMARY

The present disclosure may comprise one or more of the following features and combinations thereof.

Awaiting Inventor Approval of Claims

These and other features of the present disclosure will become more apparent from the following description of the illustrative embodiments.

DETAILED DESCRIPTION

Figure 1:
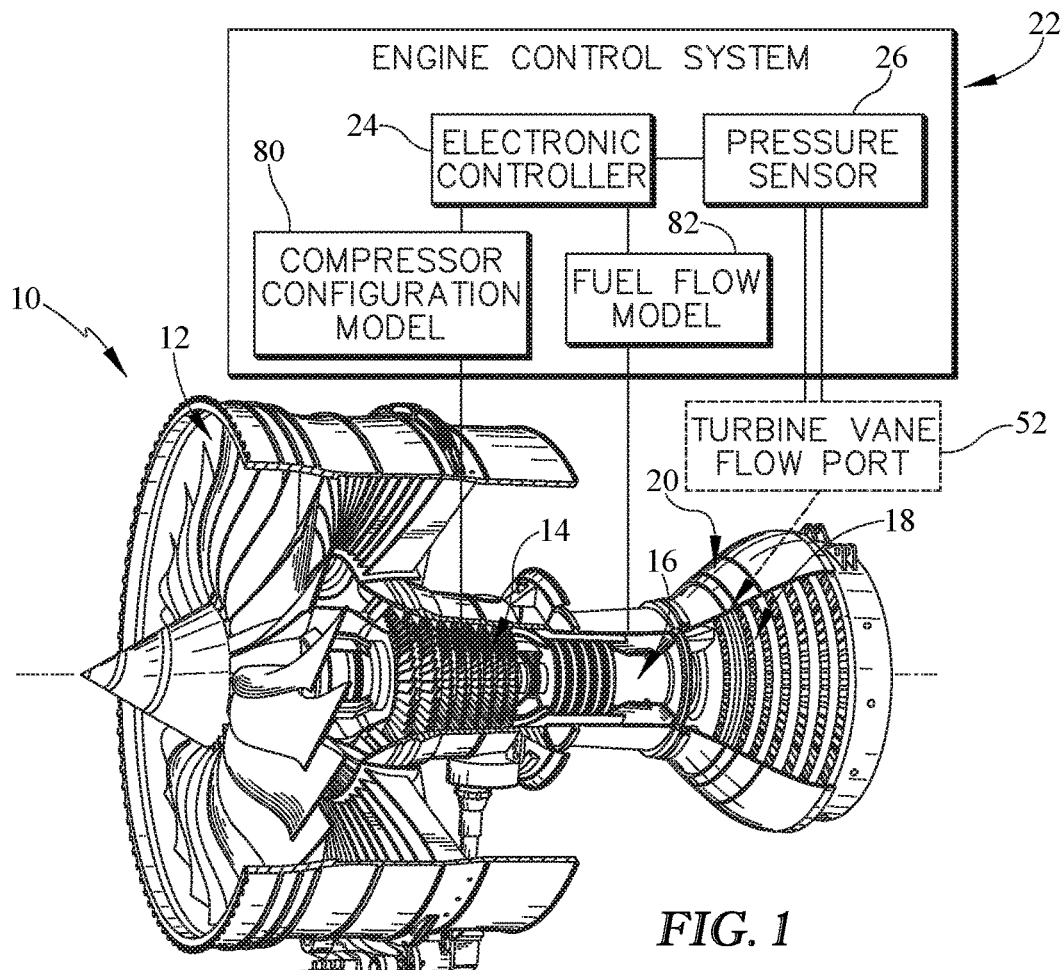
FIG. 1 is a cut-away perspective view of a gas turbine engine with an engine control system of the gas turbine engine depicted diagrammatically showing diagrammatically that a turbine vane flow port interacts with a pressure sensor to drive engine configuration via the engine control system.

For the purposes of promoting an understanding of the principles of the disclosure, reference will now be made to a number of illustrative embodiments illustrated in the drawings and specific language will be used to describe the same.

Referring now to FIG. 1, an illustrative gas turbine engine 10 includes a fan 12, a compressor 14, a combustor 16, and a turbine 18, each of which is surrounded and supported by a metallic case 20. The compressor 14 compresses and delivers air to the combustor 16. The combustor 16 mixes the compressed air with fuel, ignites the air/fuel mixture, and delivers the combustion products (i.e., hot, high-pressure gases) to the turbine 18. The turbine 18 converts the combustion products to mechanical energy (i.e., rotational power) that drives, among other things, the fan 12 and the compressor 14.

The illustrative gas turbine engine 10 also includes an engine control system 22 as shown in FIG. 1. The engine control system 22 is adapted to control various functions of the engine 10 and includes an electronic controller 24. The electronic controller 24 may have a processor and memory (not shown), and the memory may include instructions that are executable by the processor to control the various functions of the engine 10.

The engine control system 22 illustratively includes a pressure sensor 26 that is electrically coupled to the electronic controller 24 as shown in FIG. 1. The pressure sensor 26 is embodied as, or otherwise includes, any device capable of sensing a pressure of cooling air CA (see FIG. 3) within a turbine vane flow port or tap 52 included in a turbine vane 28 of the turbine 18, which is fluidly coupled to the pressure sensor 26. In the illustrative embodiment, the pressure sensor 26 is embodied as, or otherwise includes, a Venturi flow meter. However, in other embodiments, the pressure sensor 26 may be embodied as, or otherwise include, another suitable pressure measurement device, such as an orifice plate, a dall tube, a pitot tube, a multi-hole pressure probe, a cone meter, a linear resistance meter, or the like, for example.

Figures 2, 3:
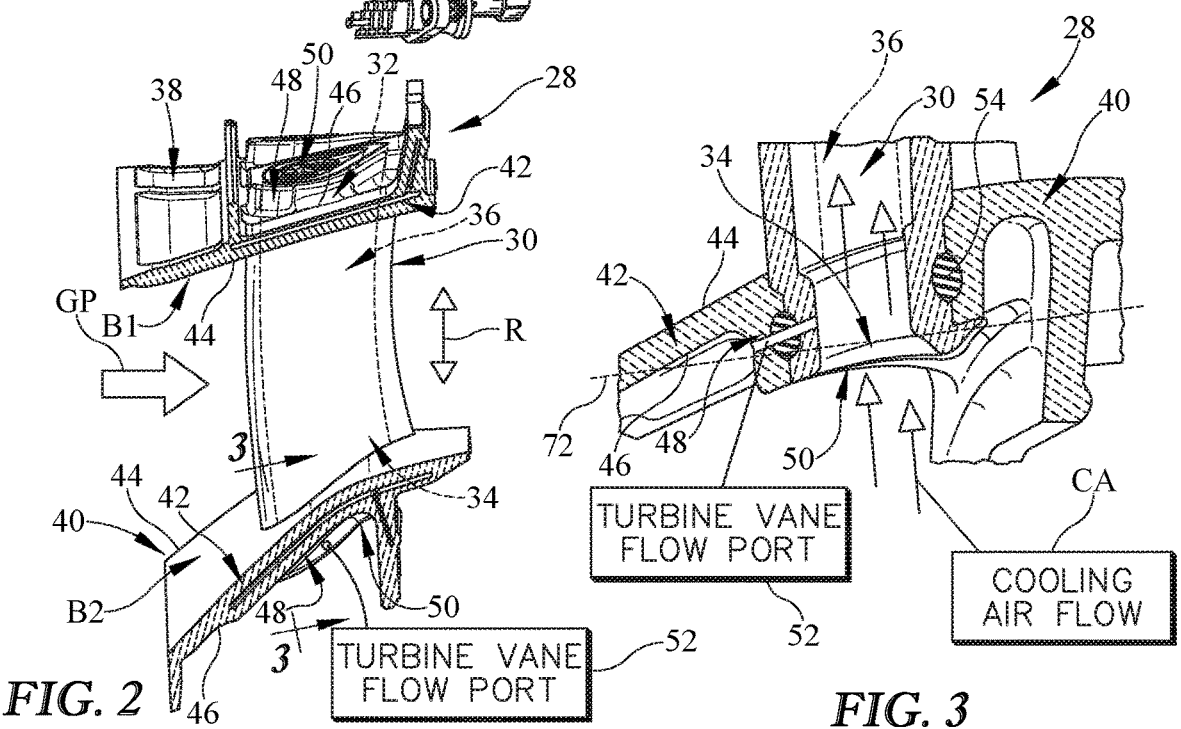
FIG. 2 is a side elevation view of a turbine vane included in the turbine section of the gas turbine engine of FIG. 1 showing that the turbine vane includes an airfoil extending across a primary gas path, a pair of end walls coupled to opposite ends of the airfoil that define boundaries of the primary gas path, and the turbine vane flow port located outside the primary gas path.
FIG. 3 is a partial sectional view of the turbine vane of FIG. 2 taken about line 3-3 showing that at least one of the end walls includes a platform exposed to the primary gas path and a projection extending away from the platform to define an opening located outside the primary gas path, and that the turbine vane flow port extends through the projection and is located adjacent to the opening so that the turbine vane flow port is exposed to cooling air provided to the opening.

A pressure of cooling air CA within the turbine vane flow port 52 is indicative of a pressure of cooling air CA conducted through an airfoil 30 of the turbine vane 28 to cool the airfoil 30 during operation of the gas turbine engine 10, as suggested by FIGS. 1-3. Based on the pressure within the turbine vane flow port 52 sensed by the pressure sensor 26, the cooling air CA passed through the airfoil 30 during operation of the engine 10 may be determined by the electronic controller 24. Determination of the cooling air CA passed through and consumed by the airfoil 30 may be used for diagnostic purposes by the electronic controller 24, such as to diagnose a blockage obstructing air flow through the airfoil 30 or a leakage leaking air flow from the airfoil 30, for example. Such data may also inform design of turbine vanes for refurbishment of existing engines and/or of new engines.

Referring now to FIG. 2, the illustrative turbine vane 28 of the turbine 18 includes the airfoil 30 and end walls 38, 40 coupled thereto near opposite radial ends 32, 34 of the airfoil 30, respectively. The airfoil 30 is shaped to interact with hot, high-pressure gasses that are discharged by the combustor 16 along a primary gas path GP during operation of the gas turbine engine 10. The end walls 38, 40 are shaped to define respective boundaries B1, B2 of the primary gas path GP near the radial ends 32, 34.

The illustrative airfoil 30 includes a passageway 36 that extends therethrough in a radial direction indicated by arrow R as shown in FIG. 2. The passageway 36 is configured to conduct cooling air CA through the airfoil 30 to cool the airfoil 30 during operation of the gas turbine engine 10. Each of the illustrative end walls 38, 40 includes a platform 42 that is at least partially exposed to the primary gas path GP and a projection 48 that extends away from the platform 42 such that the projection 48 is located outside the primary gas path GP. A surface 44 of the platform 42 is exposed to the primary gas path GP, whereas a surface 46 of the platform 42 that is arranged opposite the surface 44 is located outside the primary gas path GP. The projection 48 extends away from the surface 46 to define an opening 50 located outside the primary gas path GP. The opening 50 is fluidly coupled to the passageway 36 through the airfoil 30 to conduct cooling air CA to the passageway 36 during operation of the gas turbine engine 10.

The illustrative turbine vane 28 includes the turbine vane flow port 52 located outside the primary gas path GP as shown in FIG. 2. Although the turbine vane flow port 52 is illustratively formed in the end wall 40, in other embodiments, the turbine vane flow port 52 may be formed in the end wall 38 or in each of the end walls 38, 40. In any case, as best seen in FIG. 3, the turbine vane flow port 52 is located adjacent to the opening 50 so that the turbine vane flow port 52 is exposed to cooling air CA provided to the opening 50. Consequently, the pressure within the turbine vane flow port 52 is indicative of the flow of cooling air CA through the opening 50 and the passageway 36 during operation of the gas turbine engine 10.

In the illustrative embodiment, cooling air CA is provided to the opening 50, the turbine vane flow port 52, and the passageway 36 by the compressor 14. However, in other embodiments, cooling air CA may be provided to the opening 50, the turbine vane flow port 52, and the passageway 36 by another suitable source of cooling air CA.

Referring now to FIG. 3, the radial end 34 of the airfoil 30 is received by the end wall 40 such that the projection 48 of the end wall 40 extends around the radial end 34. A metallic component 54 is received by the end wall 40 and positioned in the projection 48 between the projection 48 and the radial end 34 to secure the end wall 40 to the airfoil 30, as further discussed below. In the illustrative embodiment, the turbine vane flow port 52 is embodied as, or otherwise includes, a passage that extends through the projection 48, the airfoil 30, and the metallic component 54. As such, the turbine vane flow port 52 is cooperatively defined by features formed in the projection 48, the airfoil 30, and the metallic component 54, as further discussed below.

In the illustrative embodiment, the airfoil 30 is bi-cast to the end wall 40 as shown in FIG. 3. That is, the metallic component 54 is received by the projection 48 of the end wall 40 and arranged between the projection 48 and the radial end 34 of the airfoil 30 to mechanically affix the end wall 40 to the airfoil 30. The metallic component 54 secures the end wall 40 to the radial end 34 of the airfoil 30 without a metallurgical bond formed therebetween. The illustrative turbine vane 28 may therefore be said to have a bi-cast construction, and as such, the radial end 32 of the airfoil 30 may be bi-cast to the end wall 38.

Figure 2A:
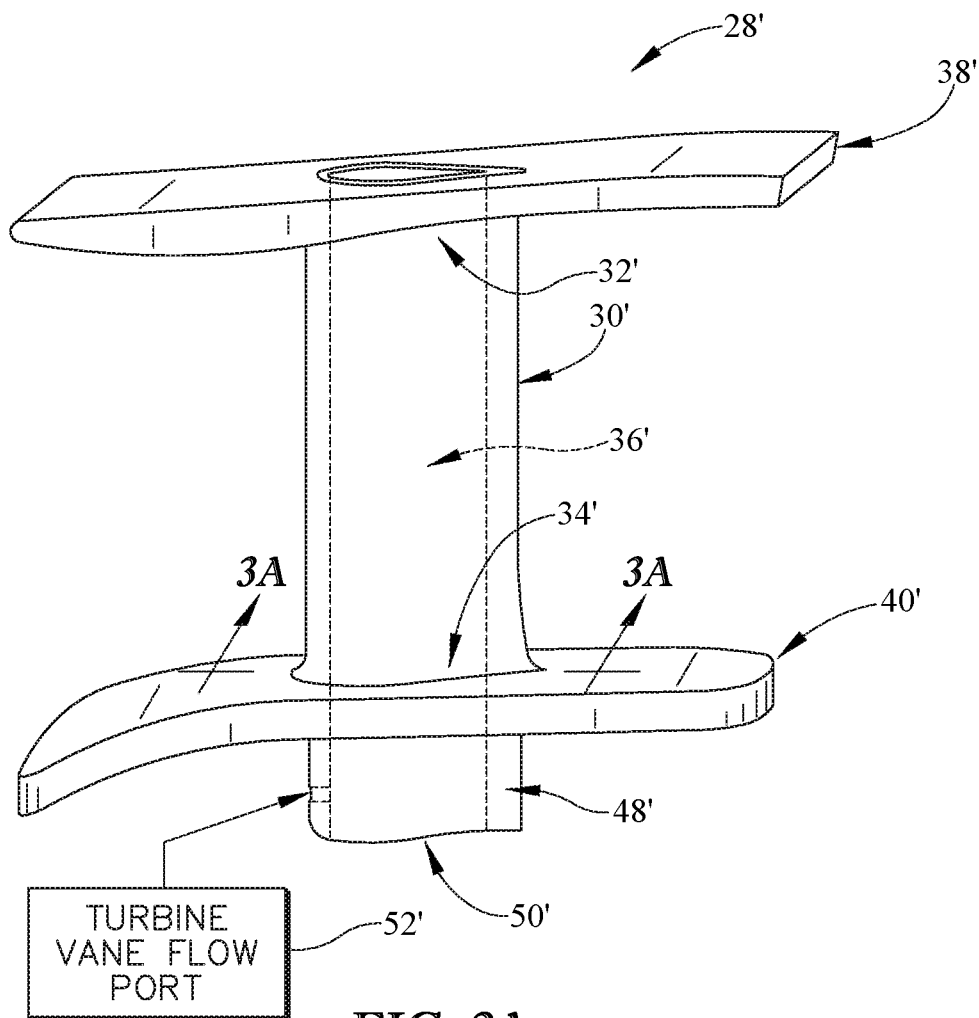
FIG. 2A is a side elevation view of another turbine vane adapted for use in the turbine section of the gas turbine engine of FIG. 1 showing that, in some embodiments, an airfoil may be integrated with end walls into a single component, and showing a turbine vane flow port arranged outside the primary gas path.
Figure 3A:
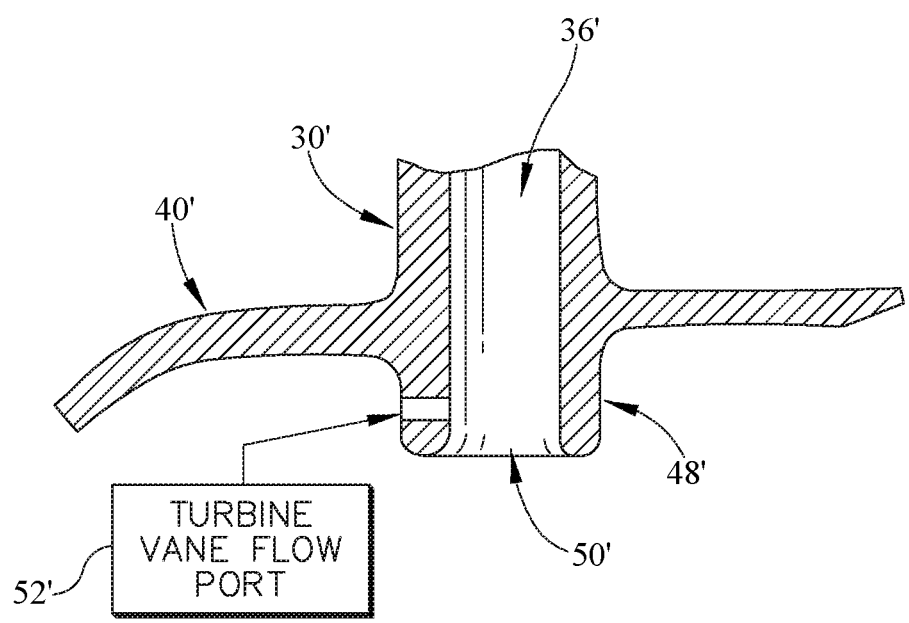
FIG. 3A is a partial sectional view of the turbine vane of FIG. 2A taken about line 3A-3A showing that the turbine vane flow port is formed through a vane-integrated protrusion.

Referring now to FIGS. 2A and 3A, an illustrative turbine vane 28' includes end walls 38', 40' and an airfoil 30' extending radially between the end walls 38', 40'. The airfoil 30' and the end walls 38', 40' may be formed separately and coupled together or integrated to form a one-piece structure. A passageway 36' formed in the airfoil 30' extends from a radial end 32' of the airfoil 30' to a radial end 34'. In other embodiments, however, the passageway 36' may extend radially through the airfoil 30' only partway. The end wall 40' is integral to the vane 28' and formed to include a projection 48', and the projection 48' defines an opening 50' that is fluidly coupled to the passageway 36'. A turbine vane flow port 52' is located adjacent the opening 50' so that the turbine vane flow port 52' is exposed to cooling air provided to the opening 50' during operation of the turbine vane 28'. In the illustrative embodiment, the turbine vane flow port 52' is cooperatively defined by the projection 48' and the airfoil 30'.

Figure 4:
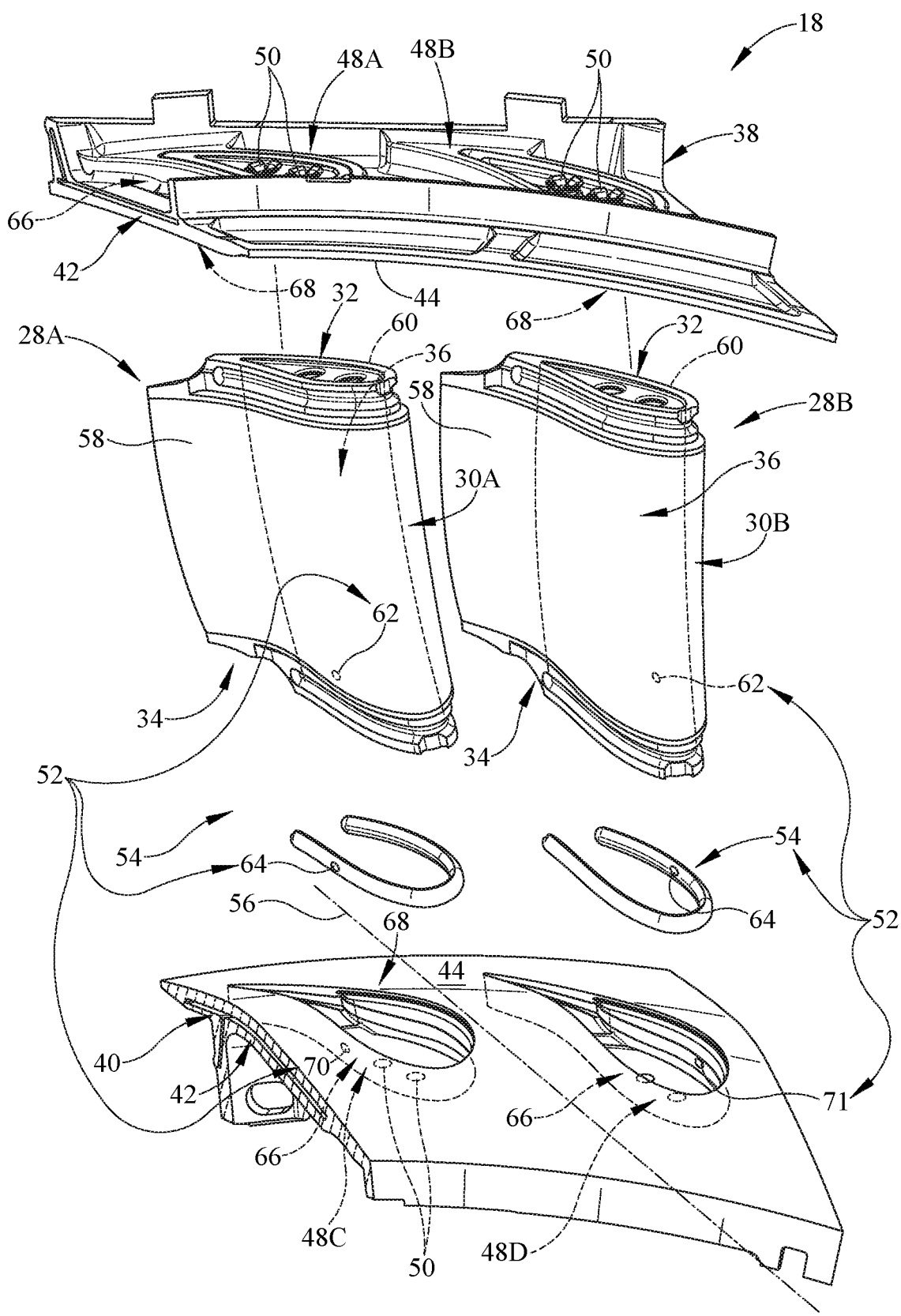
FIG. 4 is an exploded perspective view of multiple turbine vanes substantially identical to the turbine vane of FIG. 2 showing that each turbine vane includes a metallic component that is adapted to be positioned in the projection of at least one of the end walls between the end wall and the airfoil to secure the end wall to the airfoil, and showing that apertures formed in the projections, the airfoils, and the metallic components cooperatively define turbine vane flow ports of the vanes.

Referring now to FIG. 4, two illustrative turbine vanes 28A, 28B of a turbine vane doublet are arranged circumferentially adjacent to one another about a central axis 56. The end walls 38, 40 are common to each of the vanes 28A, 28B, whereas the vanes 28A, 28B include separate airfoils 30A, 30B, respectively, that are substantially identical. The turbine vanes 28A, 28B are substantially identical to one another and to the turbine vane 28 described above with reference to FIGS. 2 and 3. In the illustrative embodiment, the turbine 18 includes multiple vanes 28 substantially identical to the vanes 28A, 28B that are embodied as, or otherwise included in, a vane assembly. Of course, in other embodiments, the turbine 18 may include a vane assembly having any suitable number of vanes 28, such as one vane 28 or three or more vanes 28, for example. In any case, for the sake of simplicity, features of the turbine vane 28A are described below and discussion of the features of the turbine vane 28B is omitted.

The illustrative end wall 38 includes projections 48A, 48B that are substantially identical to one another and to the projection 48 described above with reference to FIGS. 2 and 3. Similarly, the illustrative end wall 40 includes projections 48C, 48D that are substantially identical to one another and to the projection 48. The projections 48A, 48C illustratively interact with the airfoil 30A, whereas the projections 48B, 48D illustratively interact with the airfoil 30B in a manner substantially identical to the interaction between the projections 48A, 48C and the airfoil 30A. Accordingly, interaction between the projections 48A, 48C and the airfoil 30A is described below and discussion of the interaction between the projections 48B, 48D and the airfoil 30B is omitted for the sake of simplicity.

The illustrative airfoil 30A includes a pressure side wall 58 and a suction side wall 60 arranged opposite the pressure side wall 58 as shown in FIG. 4. The pressure and suction side walls 58, 60 each extend radially from the radial end 32 to the radial end 34. In some embodiments, the passageway 36 extends radially through the airfoil 30A from the radial end 32 to the radial end 34. However, in other embodiments, the passageway 36 may extend partway through the airfoil 30A from the radial end 32 toward the radial end 34, from the radial end 34 toward the radial end 32, or between the radial ends 32, 34. In any case, a single airfoil aperture 62 illustratively formed in one of the pressure side wall 58 and the suction side wall 60 near the radial end 34 extends through the one side wall 58, 60 into the passageway 36.

The illustrative metallic component 54 is curved complementary to the shape of the radial end 34 of the airfoil 30A. When the metallic component 54 and the radial end 34 of the airfoil 30A are located in the projection 48C as suggested by FIG. 4, the metallic component 54 extends around the radial end 34 of the airfoil 30A. The metallic component 54 includes a metallic component aperture 64 that extends through the metallic component 54.

The illustrative end walls 38, 40 include slots 66 that extend radially all the way through the platforms 42 to define openings 68 in the surfaces 44 as shown in FIG. 4. The slots 66 are fluidly coupled to the openings 50 defined by the projections 48A, 48C and to the passageway 36 formed in the airfoil 30A. In some embodiments, the slots 66 may extend radially at least partway through the projections 48A, 48C to provide the openings 50. The slots 66 formed in the end wall 40 are sized to receive the metallic components 54 and the radial ends 34 of the airfoils 30A, 30B through the openings 68. The end wall 40 includes an end wall aperture 70 that extends through the projection 48C into one of the slots 66 and an end wall aperture 71 that extends through the projection 48D into the other of the slots 66.

When the metallic component 54 and the radial end 34 of the airfoil 30A are received in the projection 48C of the end wall 40, the airfoil aperture 62, the metallic component aperture 64, and the end wall aperture 70 are aligned along an axis 72 as best seen in FIG. 3. As a result of alignment along the axis 72, the airfoil aperture 62, the metallic component aperture 64, and the end wall aperture 70 cooperatively define the turbine vane flow port 52. Therefore, the turbine vane flow port 52 is at least partially defined by each of the airfoil aperture 62, the metallic component aperture 64, and the end wall aperture 70.

Interaction between the projection 48A of the end wall 38 and the radial end 32 of the airfoil 30A is substantially identical to the interaction between the projection 48C of the end wall 40 and the radial end 34 of the airfoil 30A described above. Accordingly, discussion of the interaction between the projection 48A and the radial end 32 is omitted for the sake of simplicity.

Figure 5:
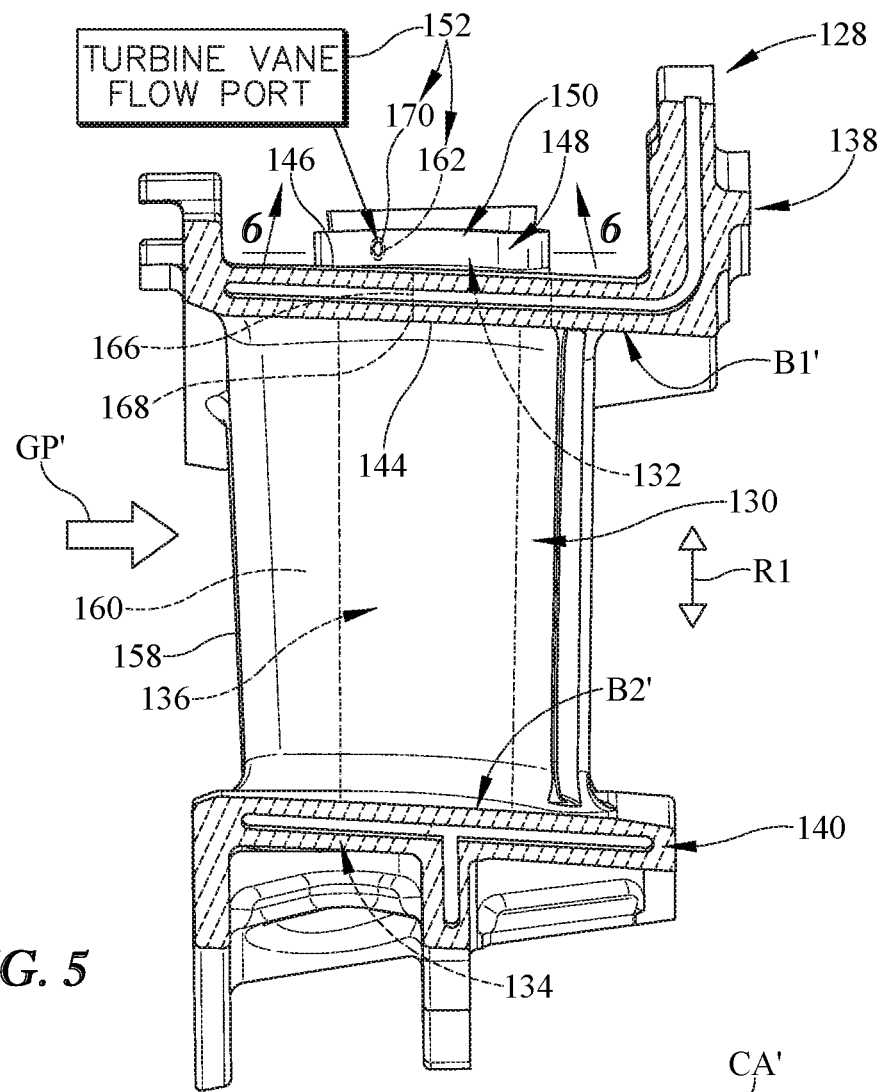
FIG. 5 is a side elevation view of another turbine vane adapted for use in the turbine of the gas turbine engine of FIG. 1 showing that the turbine vane includes an airfoil extending across a primary gas path, a pair of end walls coupled to opposite ends of the airfoil that define boundaries of the primary gas path, and a turbine vane flow port located outside the primary gas path.

Referring now to FIG. 5, a turbine vane 128 is adapted for use in the turbine 18 of the gas turbine engine 10 similar to the turbine vane 28. The illustrative turbine vane 128 includes an airfoil 130 and end walls 138, 140 coupled thereto near opposite radial ends 132, 134 of the airfoil 130, respectively. The airfoil 130 is shaped to interact with hot, high-pressure gasses that are discharged (e.g., by the combustor 16) along a primary gas path GP'. The end walls 138, 140 are shaped to define respective boundaries B1', B2' of the primary gas path GP' near the radial ends 132, 134.

The illustrative airfoil 130 includes a passageway 136 that extends therethrough in a radial direction indicated by arrow R1 as shown in FIG. 5. The passageway 136 is configured to conduct cooling air CA' (see FIG. 6) through the airfoil 130 to cool the airfoil 130. The illustrative end wall 138 includes a platform 142 that is at least partially exposed to the primary gas path GP' and a projection 148 that extends away from the platform 142 such that the projection 148 is located outside the primary gas path GP'. A surface 144 of the platform 142 is exposed to the primary gas path GP', whereas a surface 146 of the platform 142 that is arranged opposite the surface 144 is located outside the primary gas path GP'. The projection 148 extends away from the surface 146 to define an opening 150 located outside the primary gas path GP'. The opening 150 is fluidly coupled to the passageway 136 through the airfoil 130 to conduct cooling air CA' to the passageway 136.

Figure 6:
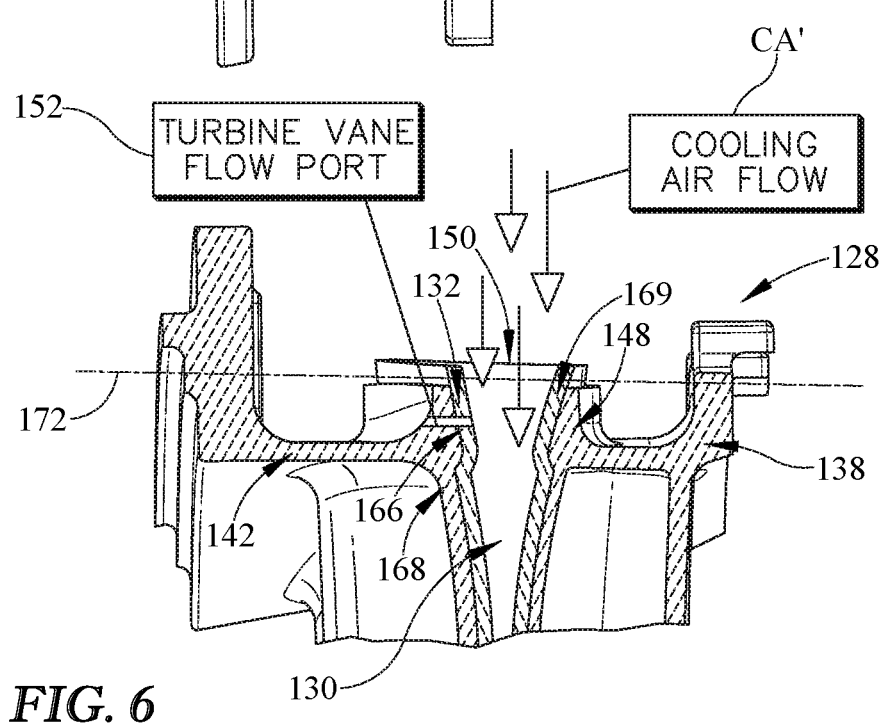
FIG. 6 is a partial sectional view of the turbine vane of FIG. 5 taken about line 6-6 showing that at least one of the end walls includes a platform exposed to the primary gas path and a projection extending away from the platform to define an opening located outside the primary gas path, and that the turbine vane flow port extends through the projection and is located adjacent to the opening so that the turbine vane flow port is exposed to cooling air provided to the opening.

The illustrative turbine vane 128 includes the turbine vane flow port 152 located outside the primary gas path GP' as shown in FIG. 5. Although the turbine vane flow port 152 is illustratively formed in the end wall 138, in other embodiments, the turbine vane flow port 152 may be formed in the end wall 140 or in each of the end walls 138, 140. In any case, as best seen in FIG. 6, the turbine vane flow port 152 is located adjacent to the opening 150 so that the turbine vane flow port 152 is exposed to cooling air CA' provided to the opening 150. Consequently, the pressure within the turbine vane flow port 152 is indicative of the flow of cooling air CA' through the opening 50 and the passageway 136.

In the illustrative embodiment, cooling air CA' is provided to the opening 150, the turbine vane flow port 152, and the passageway 136 by the compressor 14. However, in other embodiments, cooling air CA' may be provided to the opening 150, the turbine vane flow port 152, and the passageway 136 by another suitable source of cooling air CA'.

Referring now to FIG. 6, in the illustrative embodiment, the turbine vane flow port 152 is embodied as, or otherwise includes, a passage that extends through the projection 148 and the radial end 132 of the airfoil 130. As such, the turbine vane flow port 152 is cooperatively defined by features formed in the projection 148 and the airfoil 130, as further discussed below. Additionally, in some embodiments, an impingement tube 169 is integrated with the airfoil 130. In those embodiments, the turbine vane flow port 152 may extend through the impingement tube 169 such that the turbine vane flow port 152 is defined at least in part by features of the impingement tube 169.

The illustrative airfoil 130 includes a pressure side wall 158 and a suction side wall 160 arranged opposite the pressure side wall 158 as shown in FIG. 5. The pressure and suction side walls 158, 160 each extend radially from the radial end 132 to the radial end 134. In some embodiments, the passageway 136 extends radially through the airfoil 130 from the radial end 132 to the radial end 134. However, in other embodiments, the passageway 136 may extend partway through the airfoil 130 from the radial end 132 toward the radial end 134, from the radial end 134 toward the radial end 132, or between the radial ends 132, 134. In any case, a single airfoil aperture 162 formed in one of the pressure side wall 158 and the suction side wall 160 near the radial end 132 extends through the one side wall 158, 160 into the passageway 136.

The illustrative end walls 138, 140 include slots 166 that extend radially all the way through the platforms 142 to define openings 168 in the surfaces 144 as shown in FIG. 5. The slots 166 are fluidly coupled to the openings 150 defined by the projections 148 and to the passageway 136 formed in the airfoil 130. In some embodiments, the slots 166 may extend radially at least partway through the projections 148 to provide the openings 150. The slot 166 formed in the end wall 138 is sized to receive the radial end 132 of the airfoil 130 through the opening 168. The end wall 138 includes an end wall aperture 170 that extends through the projection 148 into the slot 166.

In some embodiments, the impingement tube 169 extends through the opening 168 and into the slot 166 as shown in FIG. 6. In the illustrative embodiment, the airfoil aperture 162 and the end wall aperture 170 are aligned along an axis 172. As a result of alignment along the axis 172, the airfoil aperture 162 and the end wall aperture 170 cooperatively define the turbine vane flow port 152. Therefore, the turbine vane flow port 152 is at least partially defined by each of the airfoil aperture 162, and the end wall aperture 170.

Referring back to FIG. 1, in the illustrative embodiment, the engine control system 22 includes a compressor configuration module 80 that is electrically coupled to the electronic controller 24. In conjunction with the electronic controller 24, the compressor configuration module 80 may be adapted to direct operation of the compressor 14 depending on the particular application of the gas turbine engine 10. In some applications, the electronic controller 24 and the compressor configuration module 80 may direct operation of the compressor 14 based on the pressure sensed by the pressure sensor 26 at the turbine vane flow port 52 or the turbine vane flow port 152. The compressor configuration module 80 may be adapted to monitor, store, update, and/or adjust operational characteristics of the compressor 14 based on actions performed by the engine controller 24. For example, in some embodiments, the compressor configuration module 80 may be adapted to monitor and adjust the air inlet temperature, isentropic efficiency, specific heat ratio of air, pressure ratio, suction pressure, discharge pressure, and/or vane pitch angles of, or otherwise associated with, the compressor 14 during operation of the gas turbine engine 10 based on commands provided by the engine controller 24. Additionally, in some embodiments, the compressor configuration module 80 may be included in, or otherwise form part of, the engine controller 24.

The engine control system 22 illustratively includes a fuel flow module 82 that is electrically coupled to the electronic controller 24 as shown in FIG. 1. In conjunction with the electronic controller 24, the fuel flow module 82 may be adapted to direct operation of the combustor 16 depending on the particular application of the gas turbine engine 10. In some applications, the electronic controller 24 and the fuel flow module 82 may direct operation of the combustor 16 based on the pressure sensed by the pressure sensor 26 at the turbine vane flow port 52 or the turbine vane flow port 152. The fuel flow module 82 may be adapted to monitor, store, update, and/or adjust operational characteristics of the combustor 16 based on actions performed by the engine controller 24. For example, in some embodiments, the fuel flow module 82 may be adapted to monitor and adjust the air-fuel mixture, combustion chamber efficiency, exhaust gas specific heat ratio, and pressure drop ratio of, or otherwise associated with, the combustor 16 during operation of the gas turbine engine 10 based on commands provided by the electronic controller 24. Additionally, in some embodiments, the fuel flow module 82 may be included in, or otherwise form part of, the engine controller 24.

Figure 7:
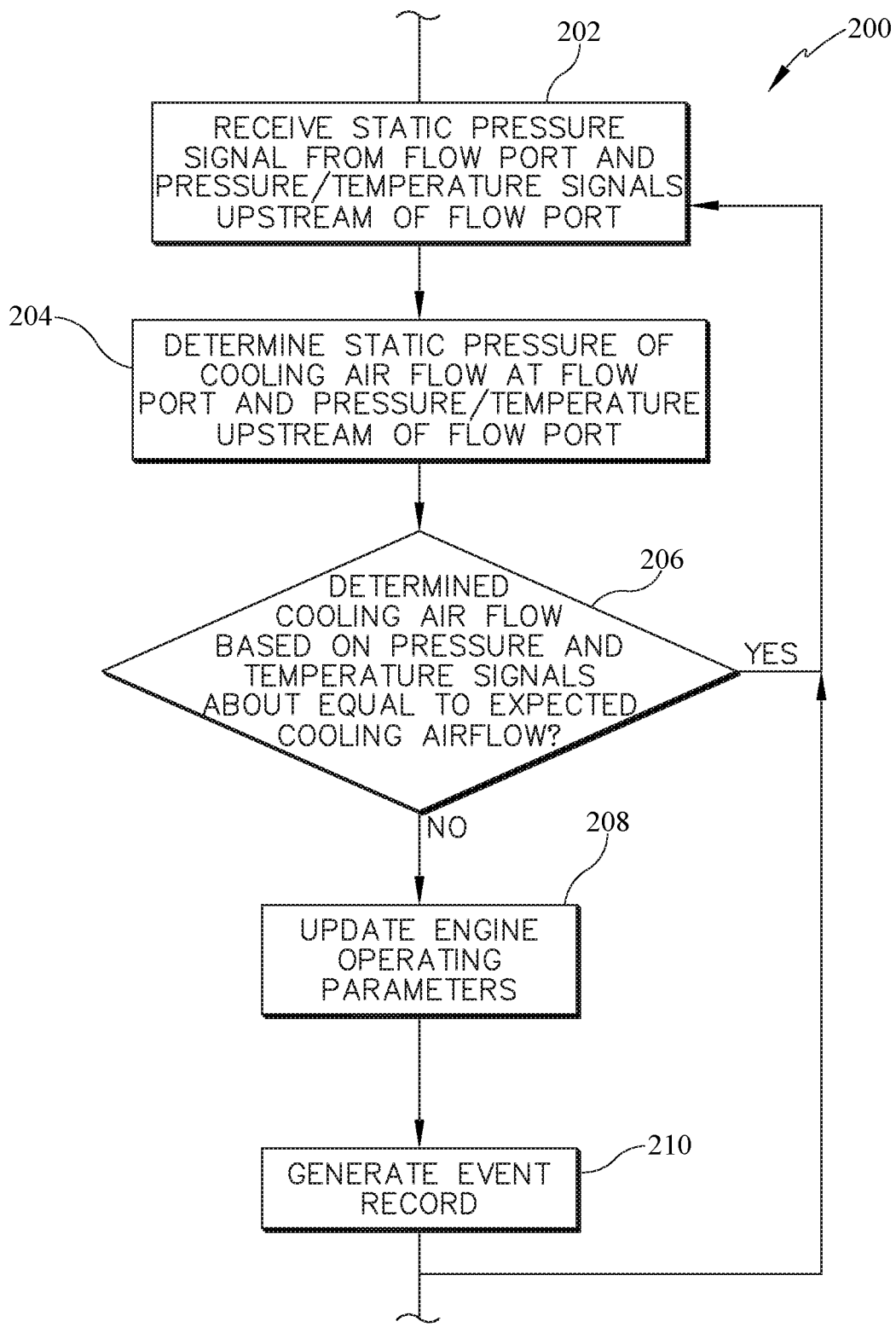
FIG. 7 is a simplified flowchart of a method of operating a gas turbine engine that may be performed by the engine control system depicted in FIG. 1.

Referring now to FIG. 7, an illustrative method 200 of operating the gas turbine engine 10 is shown. The method 200 may be embodied as, or otherwise included in, a set of instructions stored in the memory of the electronic controller 24. The set of instructions may be executed by the processor of the electronic controller 24 to perform the method 200. In any case, the method 200 may be performed in a number of sequences other than the illustrative sequence.

During engine operation, cooling air (e.g., cooling air CA or CA') entering the inlets (e.g., openings 50 or 150) may accelerate, thereby reducing its static pressure relative to lower velocity air just upstream of the inlet. By measuring cooling air inlet static pressure (e.g., cooling air pressure measured at the turbine vane flow port 52 or 152), and the total pressure and temperature of cooling air in the cavity just upstream of the inlets, the flow rate of the cooling air may be determined. A calibration curve may be generated in a laboratory to establish the relationships between these measurements, and the calibration curve may be unique to the geometry of the inlets.

The method 200 illustratively includes block 202 as shown in FIG. 7. In block 202, the signal indicative of the static pressure of cooling air flow CA or CA' within the turbine vane flow port 52 or the turbine vane flow port 152 may be received by the electronic controller 24. To perform block 202, the pressure sensor 26 may provide the signal to the electronic controller 24. Additionally, in block 202, signals indicative of a pressure and temperature of cooling air flow CA or CA' at a location upstream of the turbine vane flow port 52 or the turbine vane flow port 152 may be received by the electronic controller 24. To perform block 202, a pressure sensor and a temperature sensor adapted to sense, respectively, the pressure and temperature of cooling air flow CA or CA' upstream of the turbine vane flow port 52 or the turbine vane flow port 152 may provide the pressure and temperature signals to the electronic controller 24.

The method 200 subsequently proceeds from block 202 to block 204 as shown in FIG. 7. In block 204, the electronic controller 24 may determine, based on the signal received in block 202, the static pressure of cooling air flow CA or CA' within the turbine vane flow port 52 or the turbine vane flow port 152. As indicated above, the pressure of cooling air flow CA or CA' within the turbine vane flow port 52 or the turbine vane flow port 152 is indicative of the static pressure of cooling air flow CA or CA' through the airfoil 30 or the airfoil 130. Additionally, in block 204, the electronic controller 24 may determine, based on the pressure and temperature signals received in block 202 that are indicative of the pressure and temperature of cooling air flow CA or CA' upstream of the turbine vane flow port 52 or the turbine vane flow port 152, the pressure and temperature of cooling air flow CA or CA' upstream of the turbine vane flow port 52 or the turbine vane flow port 152.

From block 204, the method 200 proceeds to question block 206 as shown in FIG. 7. In question block 206, the electronic controller 24 determines whether the flow of cooling air CA or CA' which may be determined in block 204 based on the pressure and temperature signals provided in block 202, is about equal to a reference threshold of the flow of cooling air CA or CA'. In some embodiments, the flow of cooling air CA or CA' determined in block 204 may be compared to, evaluated in view of, or otherwise based on, flow correlation and calibration data. In any case, the reference threshold may be embodied as, or otherwise include, an expected flow of cooling air CA or CA' that signifies, or is otherwise associated with, proper operation of the gas turbine engine 10 for a particular application. In the illustrative embodiment, the reference threshold is a function of the static pressure measured at the turbine vane flow port 52 or the turbine vane flow port 152, as well as the temperature and pressure measured upstream of the turbine vane flow port 52 or the turbine vane flow port 152. As such, the reference threshold may vary according to the particular engine operating condition. In any case, if the electronic controller 24 determines in block 206 that the determined flow of cooling air CA or CA' is not about equal to the reference threshold, the method 200 proceeds to block 208. However, if the electronic controller 24 determines in block 206 that the determined flow of cooling air CA or CA' is about equal to the reference threshold, the method 200 returns to block 202.

In response to the determination in block 206 that the determined flow of cooling air CA or CA' is not about equal to the reference threshold, the electronic controller 24 updates one or more engine operating parameters in block 208 of the method 200 as shown in FIG. 7. To do so, in one example, the engine controller 24 may direct the compressor configuration module 80 to update one or more parameters associated with operation of the compressor 14. In another example, to perform block 208, the engine controller 24 may direct the fuel flow module 82 to update one or more parameters associated with operation of the combustor 16.

From block 208, the method 200 proceeds to block 210 as shown in FIG. 7. In block 208, the electronic controller 24 generates an event record of the one or more engine operating parameter updates performed in block 208. The event record may be stored by the electronic controller 24, the compressor configuration module 80, and/or the fuel flow module 82. The event record may be incorporated into the service history of the gas turbine engine 10 and used to evaluate the operation of the turbine vanes 28 or 128 for maintenance, upgrading, and/or replacement, among other things.

The present disclosure provides a method of measuring cooling air (e.g., cooling air CA or CA') consumed by airfoils (e.g., airfoils 30, 130) of turbine vanes (e.g., turbine vanes 28, 128) during operation of a gas turbine engine (e.g., gas turbine engine 10). The disclosed concepts may be directed to modifications to existing features of vane assemblies (e.g., projections 48, 148) without introducing additional hardware.

Measurement of cooling air flow consumption by turbine vanes may provide a number of benefits. In one respect, such measurement may facilitate a better understanding of cooling air flow consumption by turbine vanes during engine operation. In another respect, that measurement may facilitate monitoring of cooling air flow consumption by turbine vanes over time to determine if an airfoil burn-through (which may be accompanied by increased cooling air consumption) has occurred, or if an airfoil blockage (which may be accompanied by decreased cooling air consumption) has occurred. In yet another respect, by avoiding the introduction of additional hardware, that measurement may be associated with a degree of simplicity not attained by other configurations.

The measurement method of the present disclosure may utilize inlets (e.g., openings 50, 150) defined by features that provide sufficient material to place a pressure tap (e.g., turbine vane flow ports 52, 152). A nozzle guide vane (e.g., turbine vane 28) may include an airfoil (e.g., 30) that is bi-cast to end walls (e.g., end walls 38, 40) as shown in FIG. 3. Bi-cast doublers (e.g., projection 48 alone or combined with metallic component 54 and airfoil 30) may offer sufficient material in which to place a pressure tap. However, the flow measurement method of the present disclosure may not be limited to bi-cast constructions or arrangements.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane adapted for use in a gas turbine engine, the turbine vane comprising an airfoil shaped to interact with hot gasses moving along a primary gas path during operation of the gas turbine engine, the airfoil including a passageway that extends radially therethrough that is configured to conduct cooling air through the airfoil to cool the airfoil during operation of the gas turbine engine and an airfoil aperture that extends through a side wall of the airfoil at a location outside the gas path into the passageway, an end wall coupled to the airfoil and shaped to define a boundary of the primary gas path near a radial end of the airfoil, the end wall including a platform having a first surface exposed to the primary gas path and a second surface arranged opposite the first surface that is located outside the primary gas path, and a projection that extends away from the second surface to define an opening located outside the primary gas path that is fluidly coupled to the passageway through the airfoil to conduct cooling air to the passageway during operation of the gas turbine engine, and a turbine vane flow port located outside the primary gas path and located adjacent to the opening so that the turbine vane flow port is exposed to cooling air such that a pressure within the turbine vane flow port is indicative of the flow of cooling air through the opening and the passageway of the airfoil during operation of the gas turbine engine, wherein the turbine vane flow port is at least partially defined by the airfoil aperture.

2. The turbine vane of claim 1, wherein the turbine vane flow port extends through the projection.

3. The turbine vane of claim 1, further comprising a pressure sensor that is fluidly coupled to the turbine vane flow port and configured to sense the pressure of cooling air within the turbine vane flow port during operation of the gas turbine engine.

4. A turbine vane adapted for use in a gas turbine engine, the turbine vane comprising an airfoil shaped to interact with hot gasses moving along a primary gas path during operation of the gas turbine engine, the airfoil including a passageway that extends radially therethrough that is configured to conduct cooling air through the airfoil to cool the airfoil during operation of the gas turbine engine, an end wall coupled to the airfoil and shaped to define a boundary of the primary gas path near a radial end of the airfoil, the end wall including a platform having a first surface exposed to the primary gas path and a second surface arranged opposite the first surface that is located outside the primary gas path, and a projection that extends away from the second surface to define an opening located outside the primary gas path that is fluidly coupled to the passageway through the airfoil to conduct cooling air to the passageway during operation of the gas turbine engine, and a turbine vane flow port located outside the primary gas path and located adjacent to the opening so that the turbine vane flow port is exposed to cooling air such that a pressure within the turbine vane flow port is indicative of the flow of cooling air through the opening and the passageway of the airfoil during operation of the gas turbine engine, wherein the airfoil includes a pressure side wall, a suction side wall arranged opposite the pressure side wall, and an airfoil aperture formed in one of the pressure side wall and the suction side wall and the turbine vane flow port is at least partially defined by the airfoil aperture.

5. The turbine vane of claim 4, wherein the end wall includes an end wall aperture formed in the projection and the turbine vane flow port is at least partially defined by the end wall aperture.

6. The turbine vane of claim 5, wherein the airfoil aperture and the end wall aperture are aligned along an axis to cooperatively define the turbine vane flow port.

7. The turbine vane of claim 6, further comprising a Venturi flow meter that is fluidly coupled to the turbine vane flow port and configured to sense the pressure of cooling air within the turbine vane flow port during operation of the gas turbine engine.

8. The turbine vane of claim 5, further comprising a metallic component that is positioned in the projection between the end wall and the airfoil to secure the end wall to the airfoil.

9. The turbine vane of claim 8, wherein the metallic component includes a metallic component aperture and the turbine vane flow port is at least partially defined by the metallic component aperture.

10. The turbine vane of claim 9, wherein the airfoil aperture, the end wall aperture, and the metallic component aperture are aligned along an axis to cooperatively define the turbine vane flow port.

11. The turbine vane of claim 10, further comprising a Venturi flow meter that is fluidly coupled to the turbine vane flow port and configured to sense the pressure of cooling air within the turbine vane flow port during operation of the gas turbine engine.

12. A gas turbine engine comprising
a compressor,
a combustor, and
a turbine, the turbine including a plurality of turbine vanes each having
an airfoil shaped to interact with hot gasses discharged by the combustor along a primary gas path during operation of the gas turbine engine, the airfoil having a passageway configured to conduct cooling air provided by the compressor through the airfoil to cool the airfoil during operation of the gas turbine engine, an end wall coupled to the airfoil near a radial end of the airfoil, the end wall including a platform having a first surface exposed to the primary gas path and a second surface arranged opposite the first surface that is located outside the primary gas path, and a projection that extends away from the second surface to define an opening located outside the primary gas path that is fluidly coupled to the passageway through the airfoil to conduct cooling air to the passageway during operation of the gas turbine engine, and a turbine vane flow port located outside the primary gas path and located adjacent to the opening so that the turbine vane flow port is exposed to cooling air such that a pressure within the turbine vane flow port is indicative of the flow of cooling air through the opening and the passageway of the airfoil during operation of the gas turbine engine, wherein the airfoil of each turbine vane includes a pressure side wall, a suction side wall arranged opposite the pressure side wall, and an airfoil aperture formed in one of the pressure side wall and the suction side wall and the turbine vane flow port is at least partially defined by the airfoil aperture.

13. The gas turbine engine of claim 12, wherein the turbine vane flow port of each turbine vane extends through the projection.

14. The gas turbine engine of claim 12, wherein the end wall of each turbine vane includes an end wall aperture formed in the projection and the turbine vane flow port is at least partially defined by the end wall aperture.

15. The gas turbine engine of claim 14, wherein the airfoil aperture and the end wall aperture of each turbine vane are aligned along an axis to cooperatively define the turbine vane flow port.

16. The gas turbine engine of claim 14, wherein each turbine vane further comprises a metallic component that is positioned in the projection between the end wall and the airfoil to secure the end wall to the airfoil.

17. The gas turbine engine of claim 16, wherein the metallic component of each turbine vane includes a metallic component aperture and the turbine vane flow port is at least partially defined by the metallic component aperture.

18. The gas turbine engine of claim 17, wherein the airfoil aperture, the end wall aperture, and the metallic component aperture of each turbine vane are aligned along an axis to cooperatively define the turbine vane flow port.

* * * * *